Patented May 24, 1927.

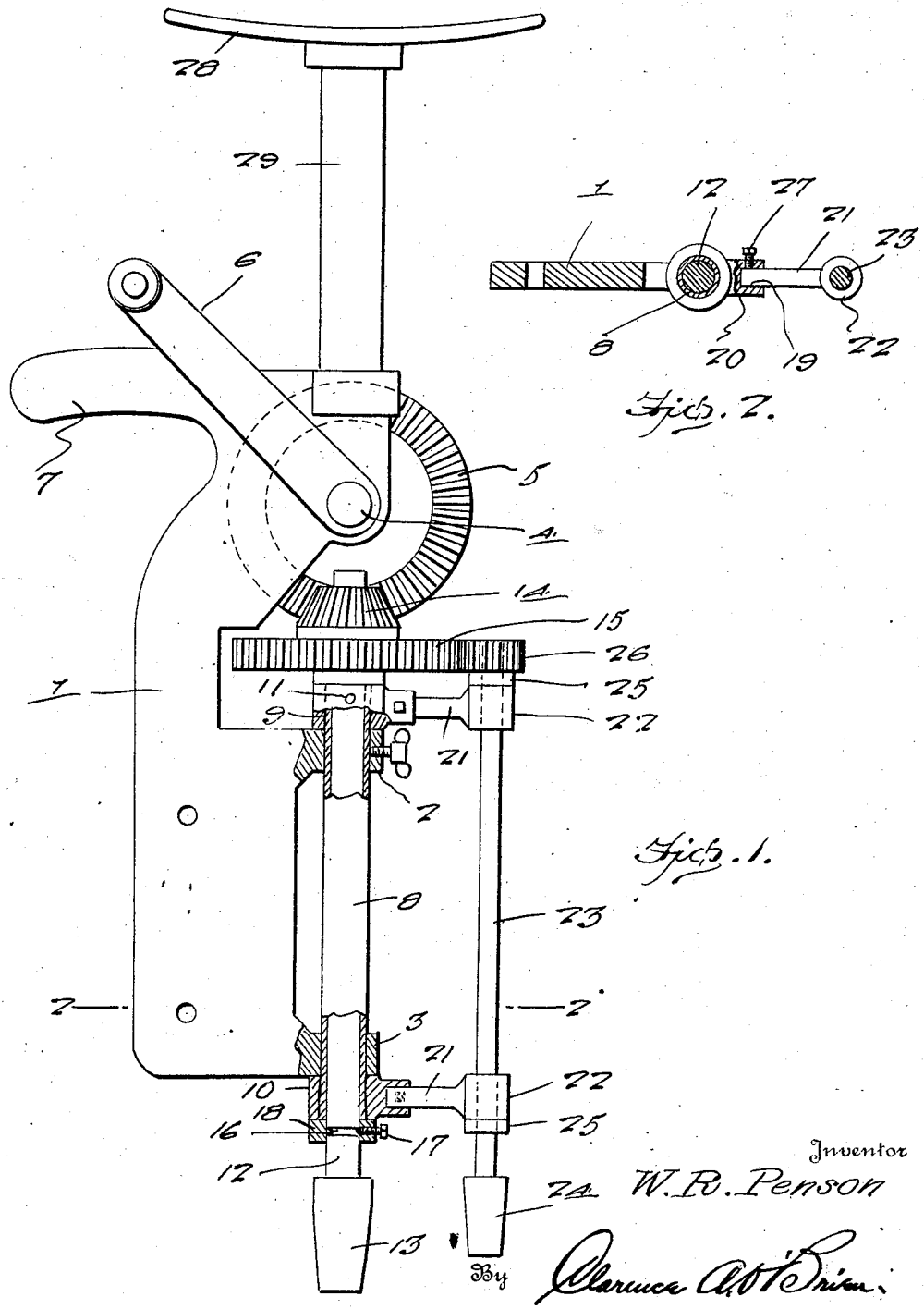

1,629,881

UNITED STATES PATENT OFFICE.

WILLIAM R. PENSON, OF SULPHUR SPRINGS, TEXAS, ASSIGNOR OF ONE-HALF TO JOHN M. FOSTER, OF KEMP, TEXAS.

DRILL.

Application filed September 11, 1924. Serial No. 737,109.

This invention relates to new and useful improvements in drills and has for its principal object to provide a simple and efficient device wherein improved means is utilized for rotating the drill chuck shaft and the drill supported therein in either direction.

A further object of the invention is to provide a drill of the above mentioned character, wherein an additional drill chuck shaft is detachably supported on the drill and adapted for rotation at a higher rate of speed than the main drill chuck shaft.

A further object of the invention is to provide a drill of the above mentioned character, which is simple in construction, inexpensive, strong and durable and furthermore adapted for the purposes for which it is intended.

Other objects and advantages of this invention will become apparent during the course of the following description.

In the accompanying drawing forming a part of this specification and in which like numerals designate like parts throughout the same:

Figure 1 is a side elevation of my improved drill; and

Figure 2 is a transverse section taken approximately on line 2—2 of Figure 1.

In the drawing wherein for the purpose of illustration is shown the preferred embodiment of my invention, the numeral 1 designates a brace forming a part of the drill and the same is provided on its side with the lateral extensions 2 and 3 respectively, the same being arranged in vertical alignment and provided with aligning openings for the purposes hereinafter to be more fully described. Extending transversely through the upper portion of the brace 1 is the crank shaft 4 and mounted on one end thereof on one side of the brace is the enlarged beveled gear 5. The opposite end of the crank shaft 4 supports thereon the handle 6 whereby the beveled gear 5 may be rotated for the purposes to be presently described. The upper end of the brace 1 furthermore is provided with an outwardly extending portion 7 which provides a handle or grip for enabling the operator to properly hold the brace while the drill is in operation.

Extending vertically through the aligning openings provided in the lateral extensions 2 and 3 formed on the lower portions of the brace 1 is the sleeve 8 and for the purpose of supporting the sleeve on the frame, I provide the collars 9 and 10 respectively. Suitable set screws or the like such as shown at 11 are associated with the collars for securing the same on the upper and lower portions of the sleeve which extends outwardly of the lateral extensions in the manner clearly illustrated.

Extending through the sleeve 8 is the drill chuck shaft 12, the lower end of which is provided with the usual chuck 13 for receiving the shank of a drill in the usual manner. The upper end of the shaft 12 carries thereon a beveled gear 14 which is adapted to mesh with beveled gear 5 whereby the drill shaft 12 may be rotated. Also carried by the upper end of the drill chuck shaft 12 and disposed below the beveled gear 5 is the large spur gear 15. The purpose of the provision of the spur gear will hereinafter be more fully set forth. The lower end of the drill chuck shaft 12 is provided with an annular groove 16 and the purpose thereof is to receive the inner end of the set screw 17 which extends through a band 18 loosely mounted on the drill chuck shaft 12 and disposed below the collar 10 in the manner clearly illustrated in the drawing.

The collars 9 and 10 respectively are provided with sockets 19 which are formed in the lateral extensions 20 on the collars and the purpose of this construction is to provide a means for detachably supporting and receiving the inwardly extending arms 21 which are provided on the collars 22 through which extends the auxiliary drill chuck shaft 23. The drill chuck shaft 23 carries on its lower end the usual chuck 24 for the purposes well known in the art, and for supporting the drill chuck shaft in position within the aligning openings provided in the collar 22 I provide the retaining collar 25.

Mounted on the upper end of the auxiliary drill chuck shaft 23 is the small spur gear 26 which meshes with the larger spur gear 14 and is adapted to be rotated thereby when the beveled gear 14 keyed on the upper end of the shaft 12 is rotated by the large beveled gear 5 mounted on the crank shaft 4. The provision of the auxiliary drill chuck shaft 23 is to provide what I term as a high speed drill chuck shaft so that when a drill is to be used and is further to be rotated at a great rate of speed, the drill chuck shaft 24 is used in preference to the drill chuck shaft 12. The arms 21 are adapted to be supported in the sockets 19 of the lateral extensions 20 on the collars 9 and 10 by means of the set screws 27 in the manner clearly shown in Figure 2 of the drawing. The construction thus provides a means whereby the auxiliary chuck shaft may be detachably secured onto the frame whenever it is desired to use the same and does not require the loss of any considerable time or labor in order to place the same in an operative position with respect to the main drill chuck shaft 12.

The upper end of the brace 1 may further be provided with a breast plate 28 and a support 29 is associated therewith, the latter being supported in the upper end of the brace in any suitable manner.

When it is desired to reverse the rotation of the drill chuck shaft 4, the beveled gear 5 and the handle 6 are removed from the crank shaft 4 and are reversed in the manner well known in the art.

It will thus be seen from the foregoing description, that a drill has been provided wherein a main drill chuck shaft and an auxiliary drill chuck shaft are connected so that the auxiliary drill chuck shaft may be rotated at a great rate of speed. When it is not desired to use the auxiliary drill chuck shaft, the same may be detached from the frame. The simplicity of my device furthermore enables the same to be manufactured at a very low cost and will be strong and durable and the parts so arranged as to be readily disconnected whenever desired.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

In a drill of the type in which a plurality of drills are operated by a single actuator, and in combination, a frame having apertured lateral projections spaced apart at one side of the frame and also having an end extension and a lateral handle and a breast plate on said extension, a sleeve disposed and supported in said apertured projections, collars fixed on said sleeve and disposed at opposite sides of said lateral projections, said collars provided with sockets, and arms detachably secured in said sockets and having coincident journal bearings, a tool carried in each of said sleeves and said journal bearings, respectively, and means on said frame adapted to operate said tools.

In testimony whereof I affix my signature.

WILLIAM R. PENSON.